(12) United States Patent
Humphrey

(10) Patent No.: US 6,467,245 B1
(45) Date of Patent: Oct. 22, 2002

(54) UNIVERSAL VIBRATORY ROLLER UNIT

(76) Inventor: John L. Humphrey, 327 Willowpointe Dr., St. Charles, MO (US) 63304

( * ) Notice: Subject to any disclaimer, the term of this patent is extended or adjusted under 35 U.S.C. 154(b) by 0 days.

(21) Appl. No.: 09/728,592

(22) Filed: Dec. 1, 2000

(51) Int. Cl.$^7$ .......................... A01D 34/42; E01C 19/41
(52) U.S. Cl. ........................ 56/249.5; 172/40; 172/118; 404/122; 404/133.05
(58) Field of Search ................ 172/21, 22, 40, 172/118, 120, 121, 122, 518, 540, 554; 56/249.5; 404/122, 131, 133.05, 133.1, 133.2

(56) References Cited

U.S. PATENT DOCUMENTS

| | | | | |
|---|---|---|---|---|
| 3,635,134 A | * | 1/1972 | Thomas | 404/117 |
| 3,814,533 A | * | 6/1974 | Buck | 404/117 |
| 3,958,892 A | * | 5/1976 | Bosslet et a l. | 404/117 |
| 4,680,922 A | * | 7/1987 | Arnold | 56/249 |
| RE33,312 E | * | 8/1990 | Elliot | 404/124 |
| 5,056,389 A | * | 10/1991 | Johnstead | 409/177 |
| 5,170,613 A | * | 12/1992 | Heise et al. | 56/249 |
| 5,261,213 A | | 11/1993 | Humphrey | 56/2 |
| 5,265,404 A | * | 11/1993 | Aldred et al. | 56/16.7 |
| 5,337,833 A | * | 8/1994 | Rizzo | 172/520 |
| 5,412,932 A | * | 5/1995 | Schueler | 56/249 |
| 5,622,034 A | * | 4/1997 | Dommert | 192/53.6 |
| 5,881,544 A | * | 3/1999 | Furford | 56/330 |
| 6,200,066 B1 | * | 3/2001 | Humphrey | 404/117 |

FOREIGN PATENT DOCUMENTS

| | | | | |
|---|---|---|---|---|
| GB | 2337914 | | 12/1999 | ......... A01D/34/62 |
| JP | 270650 | * | 10/2000 | |

* cited by examiner

*Primary Examiner*—Thomas B. Will
*Assistant Examiner*—Nathan Mammen
(74) *Attorney, Agent, or Firm*—Grace J. Fishel

(57) ABSTRACT

A vibratory roller unit for replacement of a reel cutting unit in a multiple deck lawn mower for conversion of the mower into a greensroller. The vibratory roller unit has a frame, vibratory roller and a power train. The frame, vibratory roller and power train are universal. Different motor attachment devices and lift and tow devices are provided to customize the vibratory roller unit for use with different makes and models of lawn mowers. The power train includes a jack shaft such that a motor for driving the vibratory roller is mounted on a side of the frame opposite a power take-off for driving the vibratory roller.

12 Claims, 4 Drawing Sheets

UNIVERSAL VIBRATORY ROLLER UNIT

BACKGROUND OF THE INVENTION

1. Field of the Invention

The present invention relates to a universal vibratory roller unit for use in converting a multiple deck riding lawn mower into a greensroller.

2. Brief Description of the Prior Art

A multiple deck riding lawn mower can be converted into a greensroller by replacing the reel cutting units with vibratory roller units as described in U.S. Pat. No. 5,261,213 to Humphrey. Each make or model of lawn mower, however, requires a specially designed vibratory roller unit to fit the design of the particular mower. This requires both manufacturer and distributors to stock a number of different vibratory roller units to cover all makes and models of lawn mowers. It also inconveniences customers who purchase a set of vibratory roller units to fit a particular lawn mower which may later be replaced by a different make or model requiring them to purchase a new set of vibratory roller units. A universal vibratory roller unit would greatly simplify the number of items that must be manufactured and distributed and would allow customers to update their existing vibratory roller units to fit a new mower.

BRIEF SUMMARY OF THE INVENTION

In view of the above, it is an object of the present invention to provide a vibratory roller unit that can be mounted on various makes and models of multiple deck lawn mowers. It is another object to provide a universal vibratory roller unit that reduces the number different parts that must be made by a manufacturer and stocked by distributors. It is also an object to provide a vibratory roller unit that can be updated by a customer to fit a new lawn mower. Other objects and features of the invention will be in part apparent and in part pointed out hereinafter.

In accordance with the invention, a vibratory roller unit is provided for converting a multiple deck lawn mower into a greensroller. The vibratory roller unit in major part has a frame, a vibratory roller and a power train. The frame has a pair of sidewalls connected by a crossbar. The vibratory roller has a transversely extending drum rotatably journaled in the sidewalls and an unbalanced shaft rotatably mounted within the drum. The power train includes a jack shaft rotatably journaled in the sidewalls. The jack shaft has a first end with an internal spline for engagement with a splined output shaft of a motor mounted on one of the sidewalls and a second end with a power take-off for driving the unbalanced shaft.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
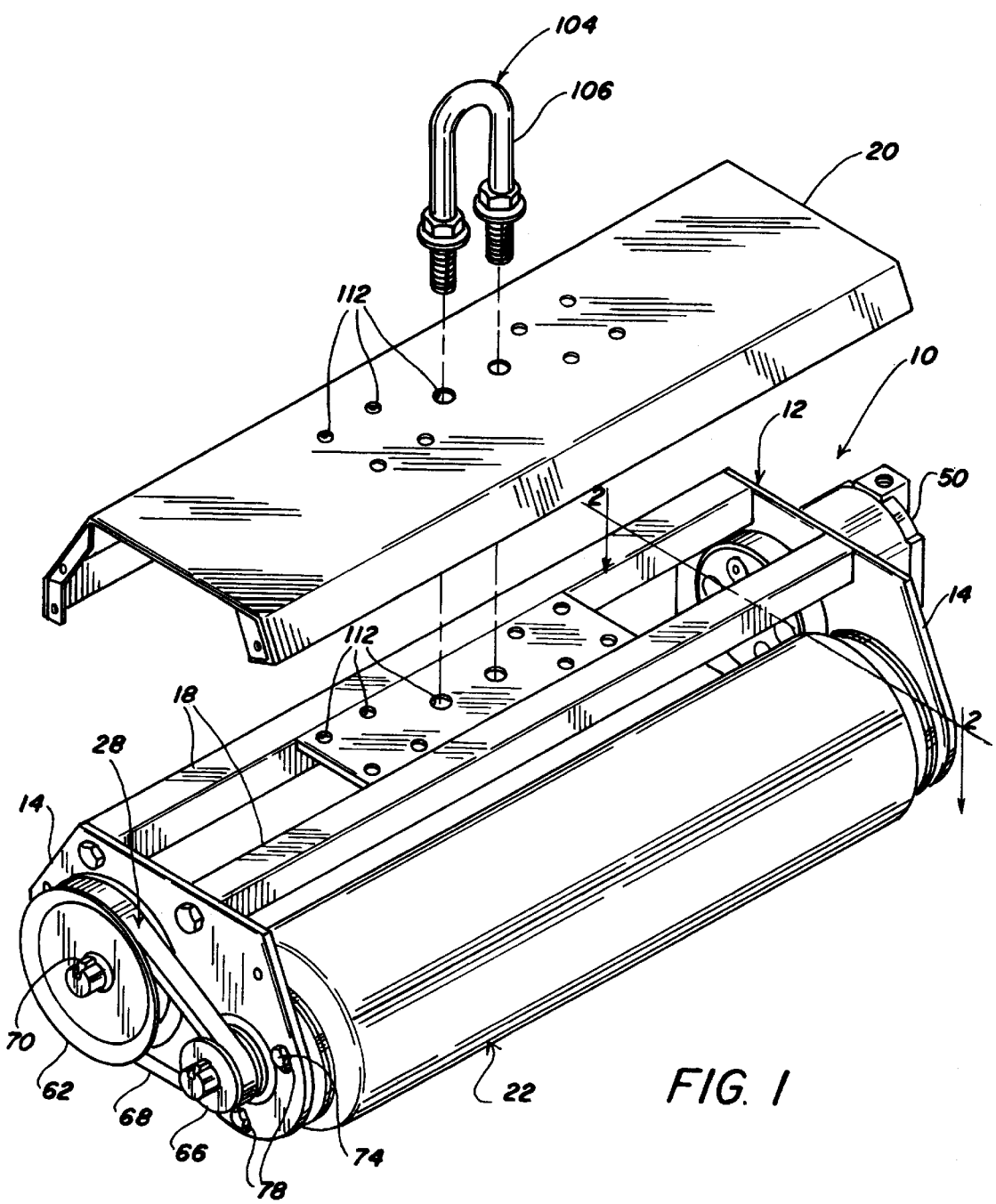
FIG. 1 is an exploded perspective view of a vibratory roller unit in accordance with the present invention.

Referring to the drawings more particularly by reference character, reference numeral 10 refers to a vibratory roller unit in accordance with the present invention. Vibratory roller unit 10 is designed for use on a multiple deck lawn mower, such as a riding triplex mower of the kind commonly used to groom golf courses. The lawn mower is converted into a greensroller by replacing the reel cutting units with vibratory roller units 10 as more particularly described hereinafter.

Vibratory roller unit 10 has a frame 12 formed of a pair of sidewalls 14 connected by a crossbar 18 formed of two rails joined in the middle by a plate. A detachable hood 20 shown in FIG. 1 is provided for safety. A vibratory roller 22 is suspended between sidewalls 14 and under crossbar 18. Preceding vibratory roller 22 is a pair of rollers 23 mounted on an axle 25 between sidewalls 14 and parallel to a longitudinal axis of vibratory roller 22. Vibratory roller unit 10 is supported for movement over the green on vibratory roller 22 and rollers 23.

Figure 2:
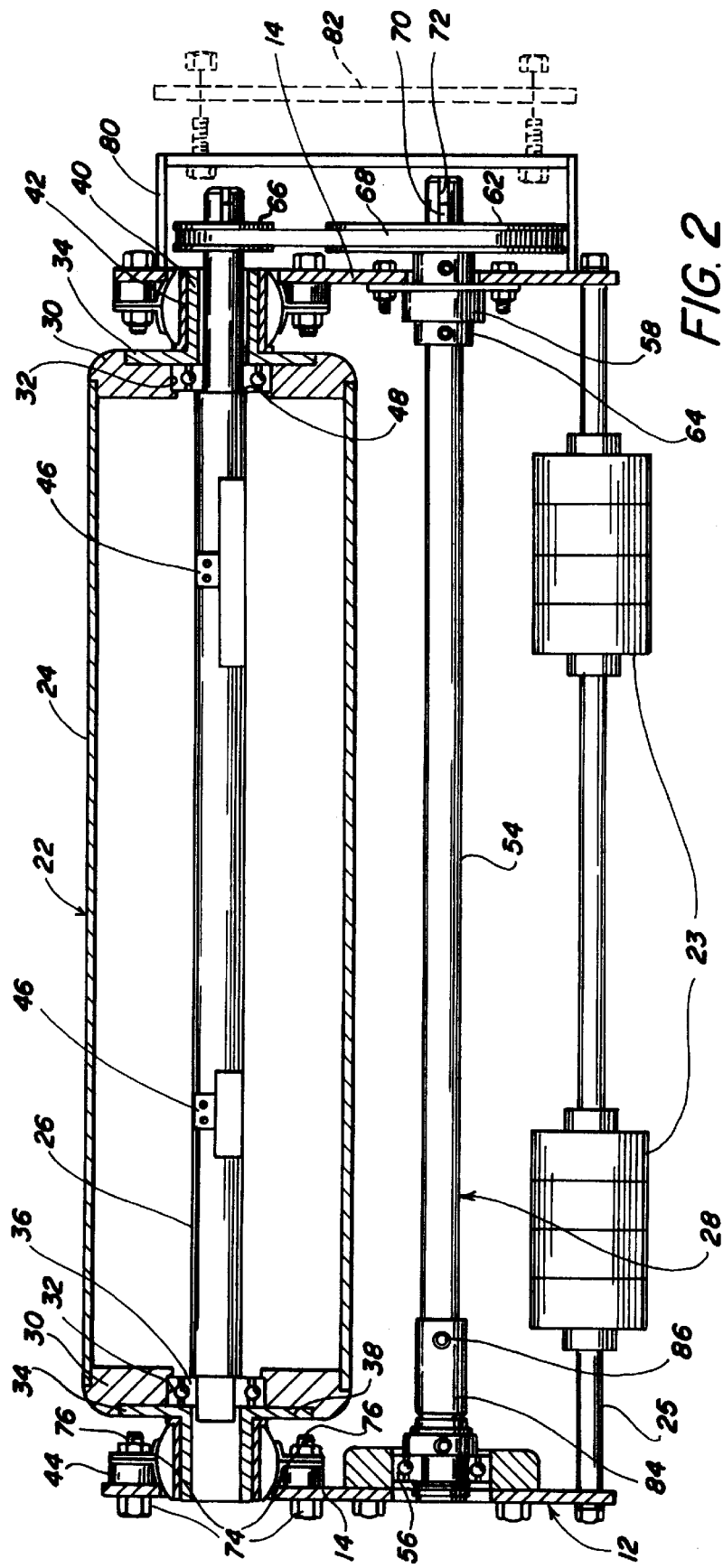
FIG. 2 is a view, partly in section, taken along line 2—2 in FIG. 1.

Vibratory roller 22 has a transversely extending drum 24 rotatably journaled in sidewalls 14 and an unbalanced shaft 26 rotatably mounted within drum 24. Shaft 26 is driven by a power train 28. As best seen in FIG. 2, drum 24 may be a hollow cylinder capped with end plates 30. End plates 30 have a central hole flanked by first and second concentric recesses 32, 34 respectively. A bearing 36 which may comprise an inner and outer race of rollers is press fit into first recess 32. Unbalanced shaft 26 is journaled in bearing 36. A circular plate 38 with an attached collar 40 is bolted into second recess 34. The back of circular plate 38 holds bearing 36 in first recess 32 and collar 40 serves as the drum axle. Collars 40 may be rotatably mounted in self-aligning, lubricated bushings 42 (i.e., plain bearings) provided in sidewalls 14. Rubber isolators 44 may be provided between bushings 42 and sidewalls 14 to isolate frame 12 from vibratory roller 22. Unbalanced shaft 26 extends through right sidewall 14 as viewed in FIG. 2 and is rotatably driven by power train 28 as more particularly described below.

Unbalanced shaft 26 has an eccentric flyweight 46. In the embodiment shown in FIG. 2, flyweight 46 is attached to shaft 26 with a pair of screws. Opposite ends of shaft 26 include an abutment shoulder 48 against which bearings 36 are seated. To equalize vibratory forces on drum 24, flyweight 46 may be divided into unequal portions, with the heaviest portion(s) being farthest from a prime mover 50 mounted on right sidewall 14 as viewed in FIGS. 1 and 6–7. This helps to compensate for the weight of prime mover 50.

Figure 6:
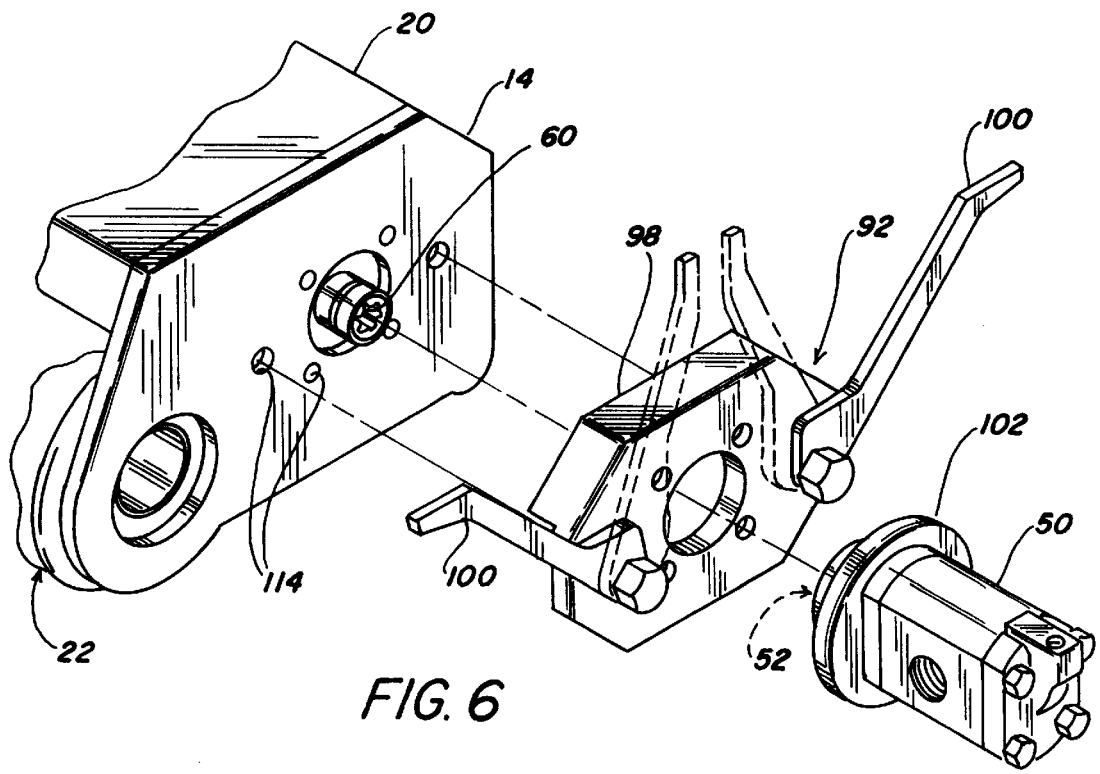
FIG. 6 is a perspective view of one motor attachment means.
Figure 7:
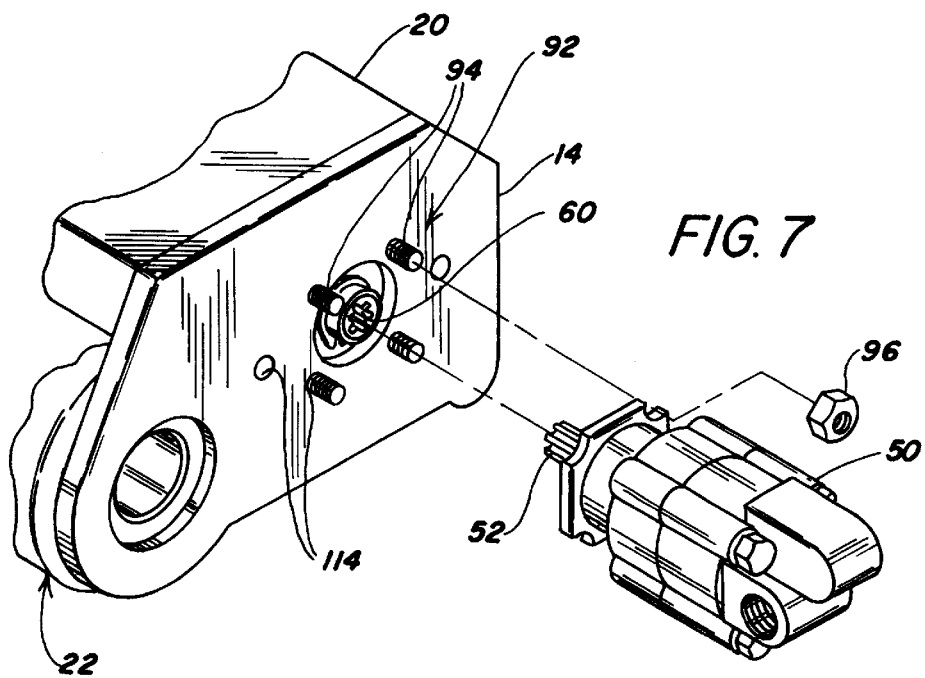
FIG. 7 is a perspective view of a second motor attachment means.

As shown in FIGS. 6 and 7, prime mover 50 is a hydraulic motor with a splined output shaft 52. One of motors 50 is provided on the lawn mower for driving each of reel cutting units which are removed when vibratory roller units 10 are installed. While prime mover 50 is illustrated as a hydraulic motor, it will be understood that prime mover may be an electric motor or the like as found on the lawn mower to which vibratory roller unit 10 is being attached. Splined output shaft 52 of motor 50 is standard on most multiple deck lawn mowers; however, the length of splined output shaft 52 and the method of attachment of the motor differs between makes and models of lawn mowers. For vibratory roller unit 10 to be universal, a means for operably mounting different motors must be provided.

Referring now to FIG. 2, power train 28 includes a jack shaft 54 rotatably journaled in sidewalls 14 on bearings 56, 58. Jack shaft 54 has a first end with an internal spline 60 seen in FIGS. 5–7 for engagement with splined output shaft 52 of motor 50. A second end of jack shaft 54 extends through bearing 58 upon which is mounted a power take-off such as a drive pulley 62. With continuing reference to FIG. 2, bearing 58 includes an eccentric locking collar 64 for locking jack shaft 54 to bearing 58 in a conventional manner. Drive pulley 62 rotates a driven pulley 66 on unbalanced shaft 26 by a belt 68. Since jack shaft 54 may be moved longitudinally in bearings 56, 58 to mate vibratory roller unit 10 to different motors 50 as more particularly described below, drive pulley 62 is keyed 70 along a longitudinal slot 72 to jack shaft 54 for positioning of drive pulley 66 on the shaft so that the same belt 68 can be used to complete power train 28. The tension on belt 68 can be adjusted by loosening nuts 74 on thread stock 76 which are received in elongated slots 78 provided in sidewalls 14. Bolts 76 mount bushings 42 in which vibratory roller 22 is received thus adjusting driven pulley 66 towards and away from drive pulley 62. Drive pulley 62, driven pulley 66 and belt 68 are shielded with a belt guard 80 to which additional plates 82 may be added to counterbalance the weight of a motor (not shown in FIG. 2) provision for which is made for mounting on opposing left sidewall 14.

Figure 5:
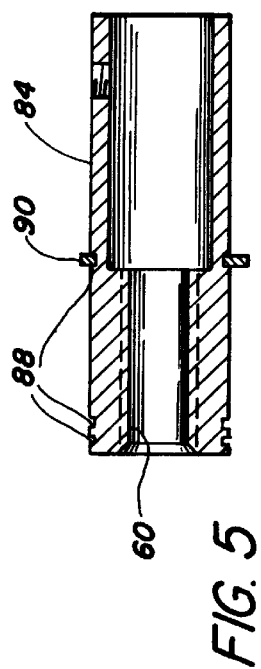
FIG. 5 is a sectional side view of a splined coupler.

Internal spline 60 on first end of jack shaft 54 is preferably provided in a splined coupler 84 which may be attached to jack shaft 54 with a roll pin 86 or the like. If splined output shaft 52 on motor 50 is unusual, an appropriate splined coupler 84 may be provided. As shown in FIG. 5, the body of splined coupler 84 includes a plurality of spaced apart circumferential grooves 88 for receipt of a snap ring 90 or the like for longitudinal positioning of jack shaft 54 in bearing 56. When snap ring 90 is in the innermost groove, internal spline 60 of coupler 84 is flush with bearing 56 on the outer face of sidewall 14. This arrangement is suitable for a motor with a splined output shaft 52 as shown in FIG. 7 such as found on a Jacobsen triplex lawn mower. When snap ring 90 is in one of the outer grooves 88 as shown in FIG. 6, internal spline 60 extends beyond bearing 56 for engagement motor 50 such as found on another model Jacobsen mower.

A motor attachment means 92 is provided on sidewall 14. As shown in FIG. 7, motor attachment 92 may be a plurality of studs 94 in sidewall 14 upon which motor 50 is mounted and to which motor is secured with mating retaining members 96 such as nuts. In other instances as shown in FIG. 6, an adapter plate 98 may be attached to sidewall 14 to which motor 50 may be mounted such as by closing pivoting arms 100 behind a circular flange 102 provided at the base of the motor. Other motor attachments 92 are provided for different motors, it being understood that the ones shown in the drawings are intended to be representative and the invention not limited to them.

Figure 3:
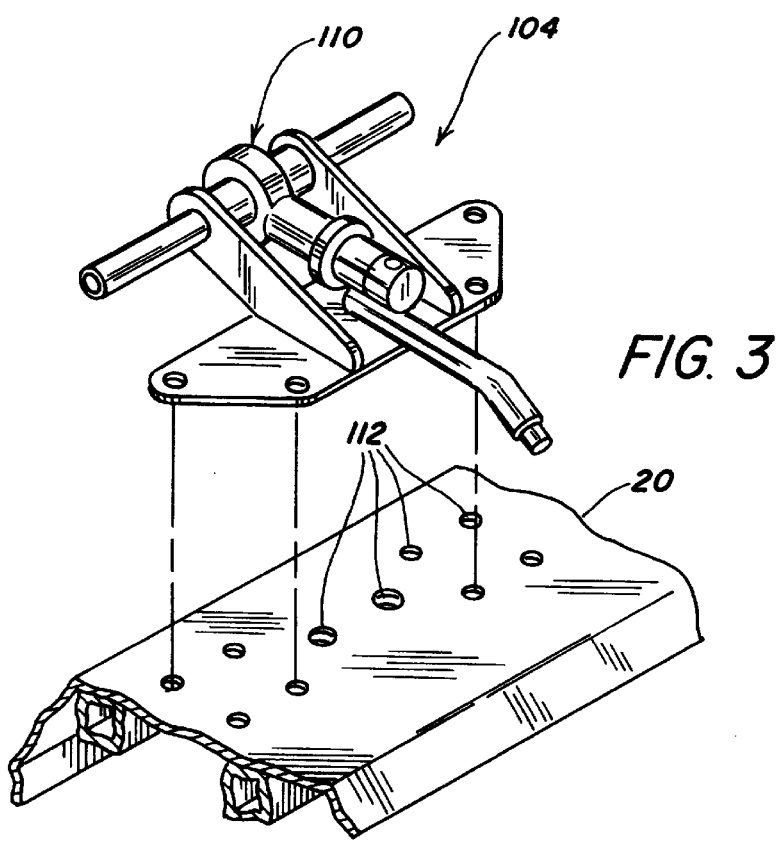
FIG. 3 is a detail on an enlarged scale showing one lift and tow means for attaching a vibratory roller unit to a multiple deck lawn mower.
Figure 4:
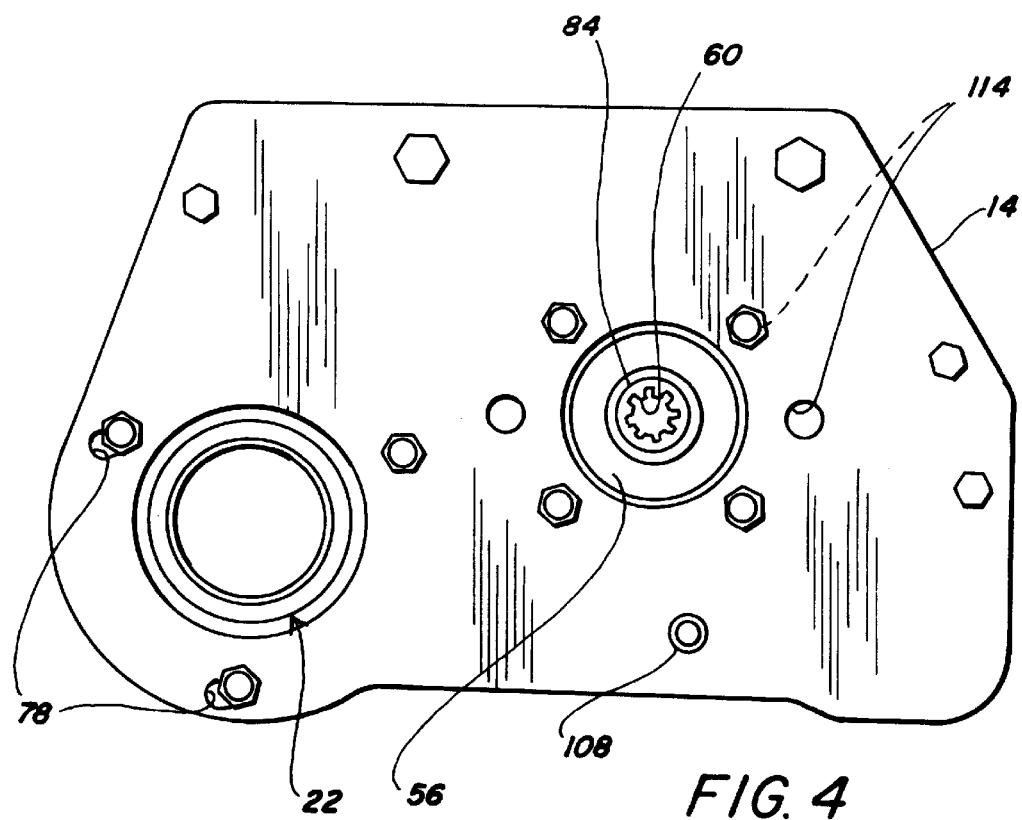
FIG. 4 is a side view of vibratory roller unit from the side on which a motor mounts.

Different lift and tow means 104 as shown in FIGS. 1 and 3 are provided for attaching the reel cutting units to different mowers. Vibratory roller unit 10 is easily fitted with appropriate hardware for attachment to different mowers. For example, Toro lawn mowers make use of a lift ring 106 as shown in FIG. 1. Lift ring 106 is bolted on crossbar 18. A ball stud 108 shown in FIG. 4 may be provided on sidewall 14 for attachment to pull arms on the mower. The reel cutting units in a John Deere mower are attached with a spherical bearing on a fixed pin 110 as shown in FIG. 3. In this instance the mower has an arm that attaches to pin 110 for lifting and towing the reel cutting unit which vibratory roller unit 10 replaces. When vibratory roller unit 10 is adapted to a John Deere mower, spherical bearing on a fixed pin 110 is bolted on crossbar 18 in place of lift ring 106. Crossbar 18 and hood 20 may be manufactured with a plurality of holes 112 such that different attachment means may be accommodated. In similar manner, sidewall 14 may be provided with a plurality of holes 114 to accommodate different motor attachments 92.

In use, vibratory roller unit 10 may be readily adapted to mount motor 50 on the left or right. This is done by making sidewalls 14 identical. Vibratory roller 22 and power train 28 may be reversed left to right. In the drawings, motor 50 is mounted on right sidewall (as viewed in FIG. 1) and drive pulley 62, driven pulley 66 and belt 68 are on left sidewall 14. The opposite arrangement may be obtained by reversing vibratory roller 22 and jack shaft 54.

The number of vibratory roller units 10 made by the manufacturer and stocked by the distributor necessary to fit different makes and models of mowers is greatly reduced. Different motor attachment means 92 and lift and tow means 104 may be provided with frame 12, vibratory roller 22 and power train 28 being universal. An appropriate number of plates 82 are attached to belt guard 80 to balance the weight of the particular motor 50. Vibratory roller units 10 also make it possible for a customer to update existing vibratory roller units to fit a new mower.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A vibratory roller unit for converting a lawn mower into a greensroller, said unit comprising a frame, a vibratory roller and a power train, said frame having a pair of sidewalls connected by a crossbar, said vibratory roller having a transversely extending drum rotatably journaled in the sidewalls and an unbalanced shaft rotatably mounted within the drum, said power train having a jack shaft rotatably journaled in first and second bearings in the sidewalls, said jack shaft having a first end with an internal spline for engagement with a splined output shaft of a motor mounted in the first bearing and a second end with a power take-off for driving the unbalanced shaft mounted in the second bearing, and means for longitudinal positioning of the jackshaft in the bearings.

2. The vibratory roller unit of claim 1 wherein the internal spline in the jack shaft is provided with a coupler attached to the first end of the jack shaft, said jack shaft journaled in the sidewall on the coupler in the first bearing, said coupler being the means for longitudinal positioning of the jackshaft in the bearings, said coupler having a plurality of transverse grooves for receipt of a snap ring for longitudinal positioning of the jack shaft in the first bearing by the coupler.

3. The vibratory roller unit of claim 2 wherein the power take off is a drive pulley for driving the unbalanced shaft keyed to the jack shaft for longitudinal positioning of the pulley on the jack shaft.

4. The vibratory roller unit of claim 1 having a motor attachment on one of the side walls.

5. The vibratory roller unit of claim 4 wherein the motor attachment comprises a plurality of studs in the sidewall upon which a motor is mounted and secured with mating retaining members.

6. The vibratory roller unit of claim 4 wherein the motor attachment comprises an adapter plate attached to one of the sidewalls and to which a motor is attached.

7. A vibratory roller unit for converting a multiple deck lawn mower into a greensroller, said unit comprising a frame, a vibratory roller and a power train, said frame having a pair of sidewalls connected by a crossbar, said sidewalls having a plurality of holes for mounting various motor attachment means and said crossbar having a plurality of holes for attaching various lift and tow means, said vibratory roller having a transversely extending drum rotatably journaled in the sidewalls and an unbalanced shaft rotatably mounted within the drum, said power train having a jack shaft rotatably journaled in first and second bearings in the sidewalls, said jack shaft having a first end with an internal spline for engagement with a splined output shaft of a motor mounted in the first bearing and a second end with a drive pulley for driving the unbalanced shaft mounted in the second bearing, and means for longitudinal positioning of the jackshaft in the bearings.

8. The vibratory roller unit of claim 7 wherein the internal spline in the jack shaft is provided in a coupler attached to the first end of the jack shaft, said jack shaft journaled in the sidewall on the coupler in the first bearing, said coupler being the means for longitudinal positioning of the jackshaft in the bearings, said coupler having a plurality of transverse grooves for receipt of a snap ring for longitudinal positioning of the jack shaft in the first bearing by the coupler.

9. The vibratory roller unit of claim 8 wherein the drive pulley is keyed to the jack shaft for longitudinal positioning of the pulley on the jack shaft.

10. The vibratory roller unit of claim 7 having a motor attachment means on one of the side walls.

11. The vibratory roller unit of claim 10 wherein the motor attachment means comprises a plurality of studs in the sidewall upon which a motor is mounted and secured with mating retaining members.

12. The vibratory roller unit of claim 10 wherein the motor attachment means comprises an adapter plate attached to one of the sidewalls and to which a motor is attached.

* * * * *